United States Patent
Hoshina (10) Patent No.: US 10,447,927 B2
(45) Date of Patent: Oct. 15, 2019

(54) ELECTRONIC DEVICE FOR DETECTING OBJECT PROXIMITY AND CONTROLLING A DISPLAY

(71) Applicant: CANON KABUSHIKI KAISHA, Tokyo (JP)

(72) Inventor: Takayuki Hoshina, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/015,419

(22) Filed: Jun. 22, 2018

(65) Prior Publication Data

US 2019/0007612 A1  Jan. 3, 2019

(30) Foreign Application Priority Data

Jun. 29, 2017 (JP) .................................. 2017-127828

(51) Int. Cl.
  *H04N 5/222* (2006.01)
  *H04N 5/232* (2006.01)
  *G09G 3/20* (2006.01)
  *G09G 3/36* (2006.01)

(52) U.S. Cl.
  CPC ........... *H04N 5/23241* (2013.01); *G09G 3/20* (2013.01); *H04N 5/23293* (2013.01); *H04N 5/232411* (2018.08); *G09G 3/3648* (2013.01); *G09G 3/3696* (2013.01); *G09G 2330/021* (2013.01); *G09G 2354/00* (2013.01); *H04N 5/23245* (2013.01)

(58) Field of Classification Search
  CPC .............................................. H04N 5/23293
  See application file for complete search history.

(56) References Cited

U.S. PATENT DOCUMENTS

| 6,845,218 | B2* | 1/2005 | Miyasaka | G03B 7/26 396/301 |
|---|---|---|---|---|
| 7,633,076 | B2* | 12/2009 | Huppi | H04M 1/72563 250/559.36 |
| 9,618,721 | B2* | 4/2017 | Kawase | G03B 17/14 |
| 10,313,586 | B2* | 6/2019 | Hoshina | G06F 3/1423 |
| 2010/0118154 | A1* | 5/2010 | Lee | H04N 5/232 348/208.4 |
| 2010/0225779 | A1* | 9/2010 | Muukki | H04N 5/232 348/223.1 |

(Continued)

FOREIGN PATENT DOCUMENTS

| JP | 2001-339627 A | 12/2001 |
|---|---|---|
| JP | 2008-252526 A | 10/2008 |

*Primary Examiner* — Gary C Vieaux
(74) *Attorney, Agent, or Firm* — Cowan, Liebowitz & Latman, P.C.

(57) ABSTRACT

An electronic device comprises: a motion detector configured to detect motion of the electronic device; a proximity detector configured to detect proximity of an object to the electronic device; a display unit; a memory; and at least one processor that function as: a control unit configured to control display preparatory processing for performing display on the display unit so as to start in response to predetermined motion of the electronic device being detected based on motion detected by the motion detector; and a display control unit configured to control display so as to be performed on the display unit in response to proximity of an object being detected by the proximity detector.

15 Claims, 8 Drawing Sheets

(56) References Cited

U.S. PATENT DOCUMENTS

| | | | |
|---|---|---|---|
| 2011/0050974 A1* | 3/2011 | Nakai | H04N 5/2251 |
| | | | 348/333.01 |
| 2013/0155041 A1* | 6/2013 | Yanai | G09G 5/003 |
| | | | 345/207 |
| 2016/0195916 A1* | 7/2016 | Shiozaki | G06F 1/3265 |
| | | | 348/333.13 |
| 2016/0227122 A1* | 8/2016 | Wada | H04N 5/23241 |
| 2017/0013194 A1* | 1/2017 | Lee | H04N 5/2251 |

* cited by examiner

ELECTRONIC DEVICE FOR DETECTING OBJECT PROXIMITY AND CONTROLLING A DISPLAY

BACKGROUND OF THE INVENTION

Field of the Invention

The present invention relates to an electronic device provided with a display device, a control method for the same, and a storage medium.

Description of the Related Art

There are known electronic devices provided with a display device that detect the proximity of a user based on detection information from a proximity detection sensor (e.g., motion sensor) or the like built into the display device and control operations of the display device. Japanese Patent Laid-Open No. 2008-252526 discloses a television receiver that powers on the device, in the case where it is judged by light detection unit and human detection unit that lighting in the room is on and there is a person present. Also, Japanese Patent Laid-Open No. 2001-339627 discloses an image capturing apparatus that is provided with an EVF (Electronic Viewfinder) and has an eye-on detection mechanism that powers on a display device in the case where it is detected by a light sensor that an eye is up close to the viewfinder. Such an eye-on detection mechanism enables power consumption to be reduced by powering off the display device in the case where the user does not have his or her eye up close.

Incidentally, while a display device generally requires that a plurality of types of voltages (driving voltages), namely, a positive voltage and a negative voltage, are applied (generated) in order to drive a display element, it is desirable, from the viewpoint of suppressing power consumption, to stop generation of the driving voltages if a user is not in proximity. In this regard, there is a problem in that since the display device requires enough time for the driving voltages to stabilize after stepping up or stepping down for generating the driving voltages has been completed, display cannot be performed immediately upon a user moving into proximity when generation of the driving voltages is stopped.

SUMMARY OF THE INVENTION

The present invention has been made in consideration of the aforementioned problems, and realizes, in an electronic device that detects proximity of a user and controls display, shortening of the display start time when proximity is detected.

In order to solve the aforementioned problems, one aspect of the present invention provides an electronic device comprising: a motion detector configured to detect motion of the electronic device; a proximity detector configured to detect proximity of an object to the electronic device; a display unit; a memory; and at least one processor that function as: a control unit configured to control display preparatory processing for performing display on the display unit so as to start in response to predetermined motion of the electronic device being detected based on motion detected by the motion detector; and a display control unit configured to control display so as to be performed on the display unit in response to proximity of an object being detected by the proximity detector.

Another aspect of the present invention provides, a control method for an electronic device having a motion detection unit configured to detect motion of an electronic device, a proximity detection unit configured to detect proximity of an object to the electronic device and a display unit, the control method comprising: controlling display preparatory processing for performing display on the display unit so as to start in response to predetermined motion of the electronic device being detected based on motion detected by the motion detection unit; and controlling display so as to be performed on the display unit in response to proximity of an object being detected by the proximity detection unit.

Still another aspect of the present invention provides, a non-transitory computer-readable storage medium storing a program for causing a computer to execute a control method of an electronic device having a motion detection unit configured to detect motion of an electronic device, a proximity detection unit configured to detect proximity of an object to the electronic device and a display unit, the control method comprising: controlling display preparatory processing for performing display on the display unit so as to start in response to predetermined motion of the electronic device being detected based on motion detected by the motion detection unit; and controlling display so as to be performed on the display unit in response to proximity of an object being detected by the proximity detection unit.

According to the present invention, it becomes possible, in an electronic device that detects proximity of a user and controls display, to shorten the display start time when proximity is detected.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Configuration of Digital Camera 100

Figure 1:
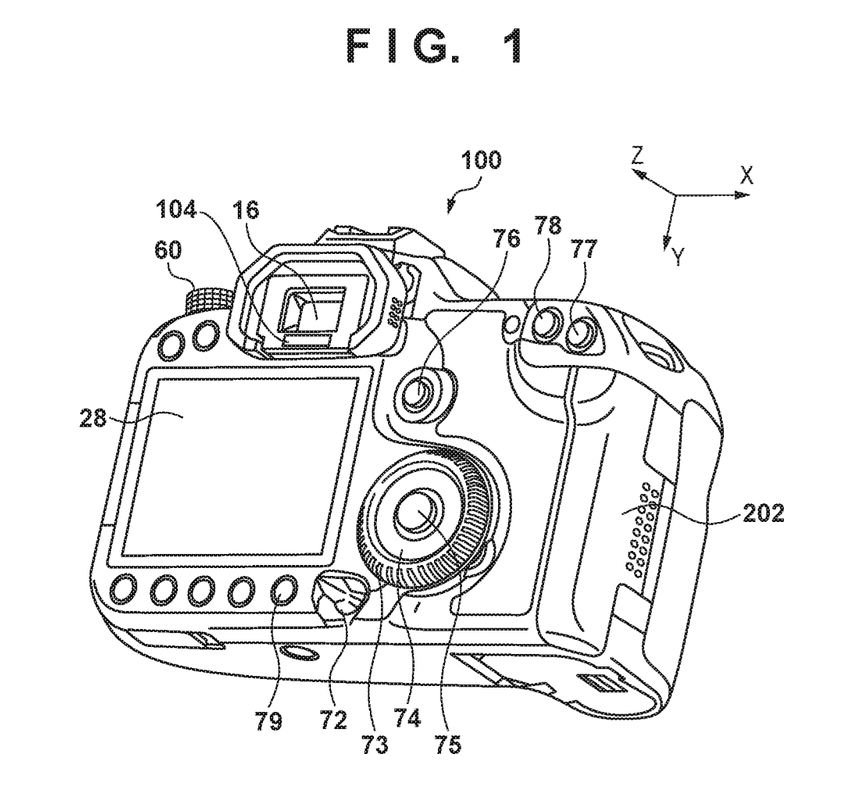
FIG. 1 is a back perspective view of a digital camera serving as an example of an electronic device according to an embodiment.

Hereinafter, preferred embodiments of the present invention will be described with reference to the drawings. FIG. 1 shows a back perspective view of a digital camera 100 serving as an example of an apparatus to which the present invention is applicable. In FIG. 1, a display unit 28 is a display unit that displays images and various types of information and is provided on a back surface of the camera. A shutter button 61 is an operation unit for issuing a shooting instruction. A mode selection switch 60 is an operation member for switching between various modes. A power switch 72 is an operation member that switches power supply of the digital camera 100 on and off. An electronic dial 73 is included in an operation unit 70, and is a rotational operation member that enables operations such as moving the selected frame and advancing images. An arrow key 74 is included in the operation unit 70, and is an arrow key (4-direction key) whose up, down, left and right portions can be respectively pressed. Operations that depend on the portion of the arrow key 74 that is pressed are possible. A SET button 75 is included in the operation unit 70, and is a push button that is mainly used to set selected items. An LV button 76 is included in the operation unit 70, and is a button for switching live view (hereinafter, LV) on and off on a menu screen. In a moving image shooting mode, the LV button 76 is used to instruct starting and stopping of moving image shooting (recording). An enlargement button 77 is included in the operation unit 70, and is an operation button for turning an enlargement mode on and off and changing a magnification ratio during live view display in a shooting mode. In a playback mode, the enlargement button 77 functions as an enlargement button for enlarging a playback image and increasing the magnification ratio. A reduction button 78 is included in the operation unit 70, and is a button for decreasing the magnification ratio of an expanded playback image and reducing a displayed image. A playback button 79 is included in the operation unit 70, and is an operation button for switching between the shooting mode and the playback mode. Pressing the playback button 79 during the shooting mode transitions to the playback mode, enabling the most recent image among the images recorded on a recording medium 200 to be displayed on the display unit 28. An eye-on viewfinder 16 is a look-through viewfinder that enables an EVF 105 to be viewed via an eyepiece unit. A lid 202 is the lid of a slot that houses the recording medium 200. A proximity detection unit 104 includes a proximity sensor, and detects the proximity of an object such as a face to the proximity detection unit 104.

Figure 2:
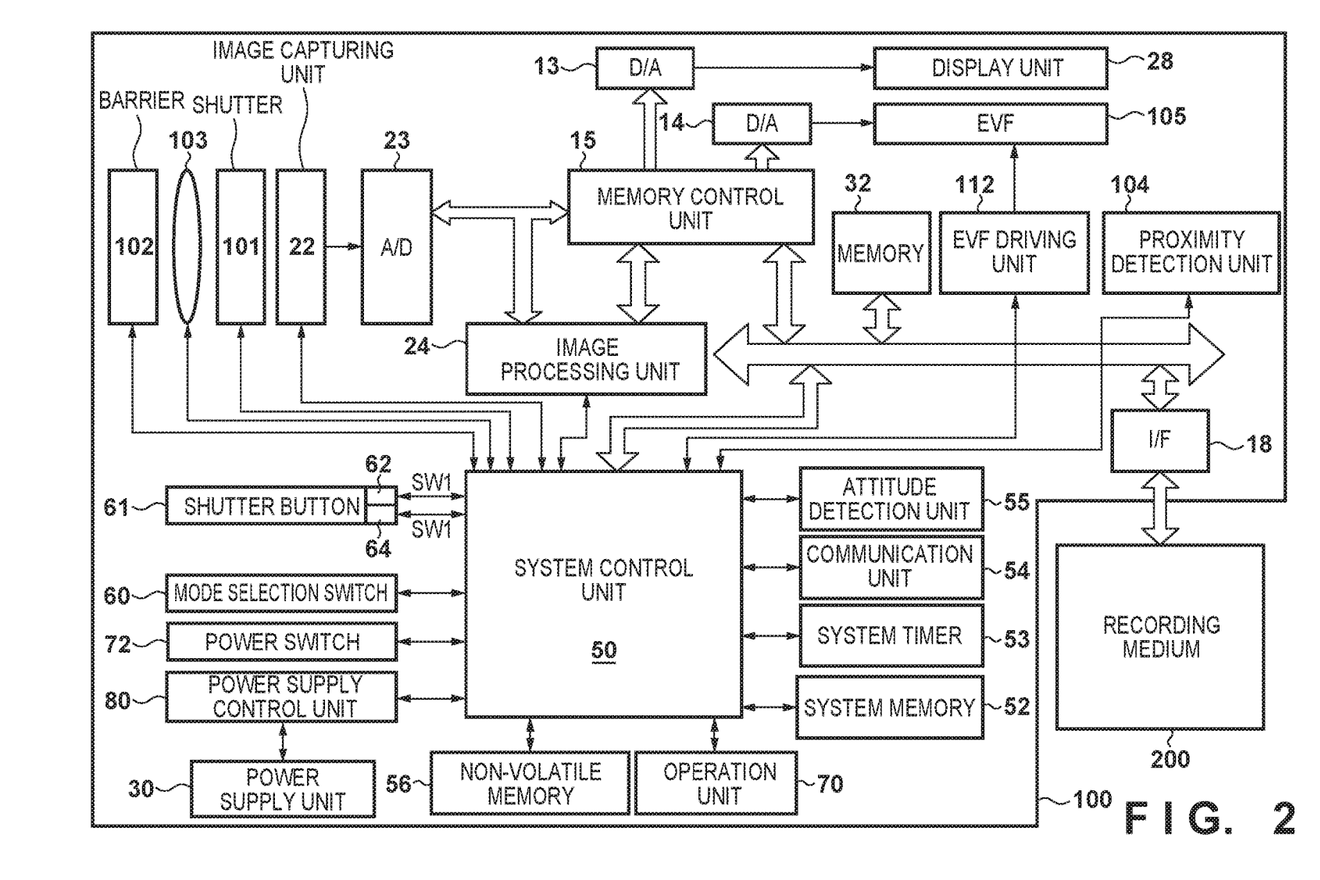
FIG. 2 is a block diagram showing an exemplary functional configuration of a digital camera according to the embodiment.

FIG. 2 is a block diagram showing an exemplary configuration of the digital camera 100 according to the present embodiment.

In FIG. 2, a taking lens 103 is a lens group including a zoom lens and a focusing lens. A shutter 101 is a shutter that is provided with an aperture function. An image capturing unit 22 is an image sensor that is constituted by a CCD sensor, a CMOS sensor or the like that converts optical images into electrical signals. The A/D convertor 23 converts an analog signal into a digital signal. The A/D convertor 23 is used in order to convert the analog signal that is output from the image capturing unit 22 into a digital signal. A barrier 102, by covering an image capturing system of the digital camera 100 that includes the taking lens 103, prevents the image capturing system including the taking lens 103, the shutter 101 and the image capturing unit 22 from contamination and damage.

An image processing unit 24 performs resize processing, such as predetermined pixel interpolation and reduction, and color conversion processing on data from the A/D convertor 23 or data from a memory control unit 15. Also, the image processing unit 24 performs predetermined computational processing using captured image data, and a system control unit 50 performs exposure control and ranging control based on the obtained computation result. AF (auto focus) processing, AE (auto exposure) processing, and EF (electronic flash) processing that employ a TTL (through-the-lens) system are thereby performed. The image processing unit 24 further performs predetermined computational processing using captured image data, and also performs AWB (automatic white balance) processing employing the TTL system based on the obtained computation result.

Output data from the A/D convertor 23 is written to a memory 32 directly via the memory control unit 15 or via the image processing unit 24 and the memory control unit 15. The memory 32 stores image data obtained by the image capturing unit 22 and converted into digital data by the A/D convertor 23, and image data for displaying on the display unit 28. The memory 32 is provided with sufficient storage capacity to store a predetermined number of still images and moving images and audio of a predetermined length.

Also, the memory 32 doubles as a memory for image display (video memory). A D/A converter 13 converts data for image display that is stored in the memory 32 into an analog signal, and supplies the analog signal to the display unit 28. Image data for display written in the memory 32 is thus displayed by the display unit 28 via the D/A converter 13. The display unit 28 performs display that depends on the analog signal from the D/A converter 13 on a display such as an LCD serving as a display monitor. Digital signals obtained through A/D conversion by the A/D convertor 23 and stored in the memory 32 undergo analog conversion in the D/A converter 13 and are sequentially transferred to the display unit 28 to enable through image display (live view display). The display unit 28 is provided with a touch panel over the entire surface of the display, and is able to accept touch operations from the user on a menu screen displayed on the display.

A D/A converter 14 converts data for image display that is stored in the memory 32 into an analog signal, and supplies the analog signal to the EVF 105. The EVF 105 is provided with a display device that is constituted by an organic EL display, a liquid crystal display or the like, for example, within the viewfinder 16. In the case where the display device is an organic EL display, for example, the display device incorporates an organic EL panel employing a thin-film transistor active-matrix drive system. One display element of the organic EL panel is constituted by three RGB organic EL elements, and emits light as a result of a voltage being applied to the organic EL elements. In the EVF 105, the voltage that is applied to each organic EL element by an EVF driving unit 112 is adjusted to control the light emission amount of each color, enabling a desired image to be tonally displayed. Data for image display that is stored in the memory 32 is displayed when the user looks through the viewfinder 16, and live view display is realized. The display unit 28 and the EVF 105 are capable of menu screen display, image file display, live view display and the like, in response to instructions of the system control unit 50. The display unit 28 and the EVF 105 are able to perform on/off control of each display independently through the operation unit 70.

The EVF driving unit 112 includes a drive circuit that supplies a drive timing signal for driving the EVF 105, and includes a step-up unit and a step-down unit for generating driving voltages of the EVF 105. The EVF driving unit 112 generates various driving voltages, and applies the generated driving voltages to the EVF 105 in synchronization with the drive timing signal. The proximity detection unit 104 includes an infrared light emitting body and a light receiving circuit, and detects whether an object is in a prescribed position, by emitting infrared light at a fixed interval and measuring the amount of light reflected by the object. The proximity detection unit 104, by being disposed in the vicinity of the EVF 105, functions as an eye-on detection unit that detect that the user is looking through the viewfinder 16 and that his or her eye is on the eyepiece unit of the viewfinder 16. The proximity detection unit 104 is capable of detecting the distance to the user with detection threshold values over a plurality of levels. The system control unit 50, upon acquiring proximity detection information that is output from the proximity detection unit 104, stops display of the display unit 28 and starts display of the EVF 105.

A nonvolatile memory 56 is a memory serving as a recording medium that is electrically erasable and recordable, and an EEPROM or the like is used, for example. Constants for use in operations of the system control unit 50, programs and the like are stored in the nonvolatile memory 56. The programs referred to here are computer programs for executing various flowcharts which will be discussed later in the present embodiment.

The system control unit 50 is a control unit having at least one processor, and performs overall control of the digital camera 100. By executing the aforementioned programs recorded in the nonvolatile memory 56, various processing of the present embodiment which will be discussed later is realized. A RAM is used for a system memory 52. Constants and variables for use in operations of the system control unit 50, programs read out from the nonvolatile memory 56 and the like are expanded in the system memory 52. The system control unit 50 also performs display control by controlling the memory 32, the D/A converter 13, the display unit 28 and the like.

A system timer 53 is a clocking unit for measuring time that is used in various controls and the time of an internal clock.

The mode selection switch 60, the shutter button 61 and the operation unit 70 are operation unit for inputting various types of operating instructions to the system control unit 50.

The mode selection switch 60 switches the operating mode of the system control unit 50 to one of a still image recording mode, the moving image shooting mode, the playback mode, and the like. The still image recording mode includes an auto shooting mode, an auto scene discrimination mode, a manual mode, an aperture priority mode (Av mode), and a shutter speed priority mode (Tv mode). Also, there are various scene modes that serve as shooting-scene specific shooting settings, a programmed AE mode, a custom mode, and the like. Any of these modes are directly switched to with the mode selection switch 60. Alternatively, after initially switching to a list screen of shooting modes with the mode selection switch 60, one of the plurality of displayed modes may be selected, and the selected mode may then be switched to using another operation member. Similarly, a plurality of modes may also be included in the moving image shooting mode.

A first shutter switch 62 turns on when the shutter button 61 provided in the digital camera 100 is partially operated, that is, with a so-called half press (shooting preparation instruction), and produces a first shutter switch signal SW1. As a result of the first shutter switch signal SW1, the operations of AF (autofocus) processing, AE (automatic exposure) processing, AWB (automatic white balance) processing, EF (electronic flash) processing and the like are started.

A second shutter switch 64 turns on when the shutter button 61 is fully operated, that is, with a so-called full press (shooting instruction), and produces a second shutter switch signal SW2. As a result of the second shutter switch signal SW2, the system control unit 50 starts the operations of a series of shooting processing from signal readout from the image capturing unit 22 to writing of image data to the recording medium 200.

As a result of an operation such as selection of various function icons that are displayed on the display unit 28 being performed, the operation members of the operation unit 70 are appropriately allocated a function for each scene and acts as various function buttons. The function buttons include an end button, a back button, an image advance button, a jump button, a stop-down button and an attribute modification button, for example. For example, a settable menu screen is displayed on the display unit 28 when a menu button is pressed. The user is able to intuitively perform various settings using the menu screen displayed on the display unit 28, the 4-direction (up, down, left, right) button and the set button.

A power supply control unit 80 is constituted by a battery detector circuit, a DC-DC converter, a switch circuit that switches the block to be electrified and the like, and detects whether or not a battery is mounted, the type of battery, and the remaining battery charge. Also, the power supply control unit 80 controls the DC-DC converter based on these detection results and instructions from the system control unit 50, and supplies a required voltage to units including the recording medium 200 for a required period.

A power supply unit 30 consists of a primary battery such as an alkaline battery and a lithium battery, a secondary battery such as a NiCd battery, a NiMH battery and a Li ion battery, an AC/DC adaptor, and the like. A recording medium I/F 18 is an interface with the recording medium 200 which is a memory card, a hard disk or the like. The recording medium 200 is a recording medium such as a memory card for recording captured images, and is constituted by a semiconductor memory, an optical disk, a magnetic disk or the like.

A communication unit 54 is connected wirelessly or by cable, and transmits and receives video signals, audio signals and the like. The communication unit 54 is also capable of connecting to a wireless LAN (Local Area Network) and the Internet. The communication unit 54 is capable of transmitting images (including through images) captured by the image capturing unit 22 and images recorded on the recording medium 200, and is able to receive image data and other various information from an external device.

An attitude detection unit 55 includes an acceleration sensor or a gyroscope sensor, for example, and detects the attitude of the digital camera 100 with respect to the gravitational direction. The attitude detection unit 55 is able to output the acceleration of each component of three axes (X, Y, Z), and is thus able to detect the motion of the digital camera 100, based on the acceleration detected by the attitude detection unit 55. Note that, in the present embodiment, a 3-axis coordinate system is adopted as shown in FIG. 1. That is, the X-axis is in the horizontal direction (right-left direction), as seen from the back surface of the digital camera 100, with the right side as seen from the back surface being the positive direction. Also, the Y-axis is in the vertical direction (up-down direction) of the digital camera 100, with the direction of gravity, that is, the down side being the positive direction of the Y-axis. Furthermore, the Z-axis is in the front-back direction of the digital camera 100, with the backside being the positive direction. A characteristic of the acceleration output of the attitude detection unit 55 is that the X-axis and Y-axis components of gravitational acceleration change in a range of $-1.0$ g to $1.0$ g when the digital camera is rotated in a roll direction (about the Z-axis), for example. In the case where the digital camera 100 is rotated in the roll direction, the Z-axis component will constantly be 0 g, since the Z-axis direction is not affected by changes in gravitational acceleration. Note that the characteristics of acceleration that are detected in the eye-on shooting preparatory operation, which will be discussed later, will be discussed later. Also, by using the detection result of the attitude detection unit 55, it is distinguishable whether the image captured by the image capturing unit 22 is an image captured with the digital camera 100 held vertically or an image captured with the digital camera 100 held horizontally. The system control unit 50 is able to add direction information that depends on the attitude detected by the attitude detection unit 55 to an image file of the image captured with the image capturing unit 22 or to rotate and record the image.

Configuration of Proximity Detection Unit 104

Figure 3:
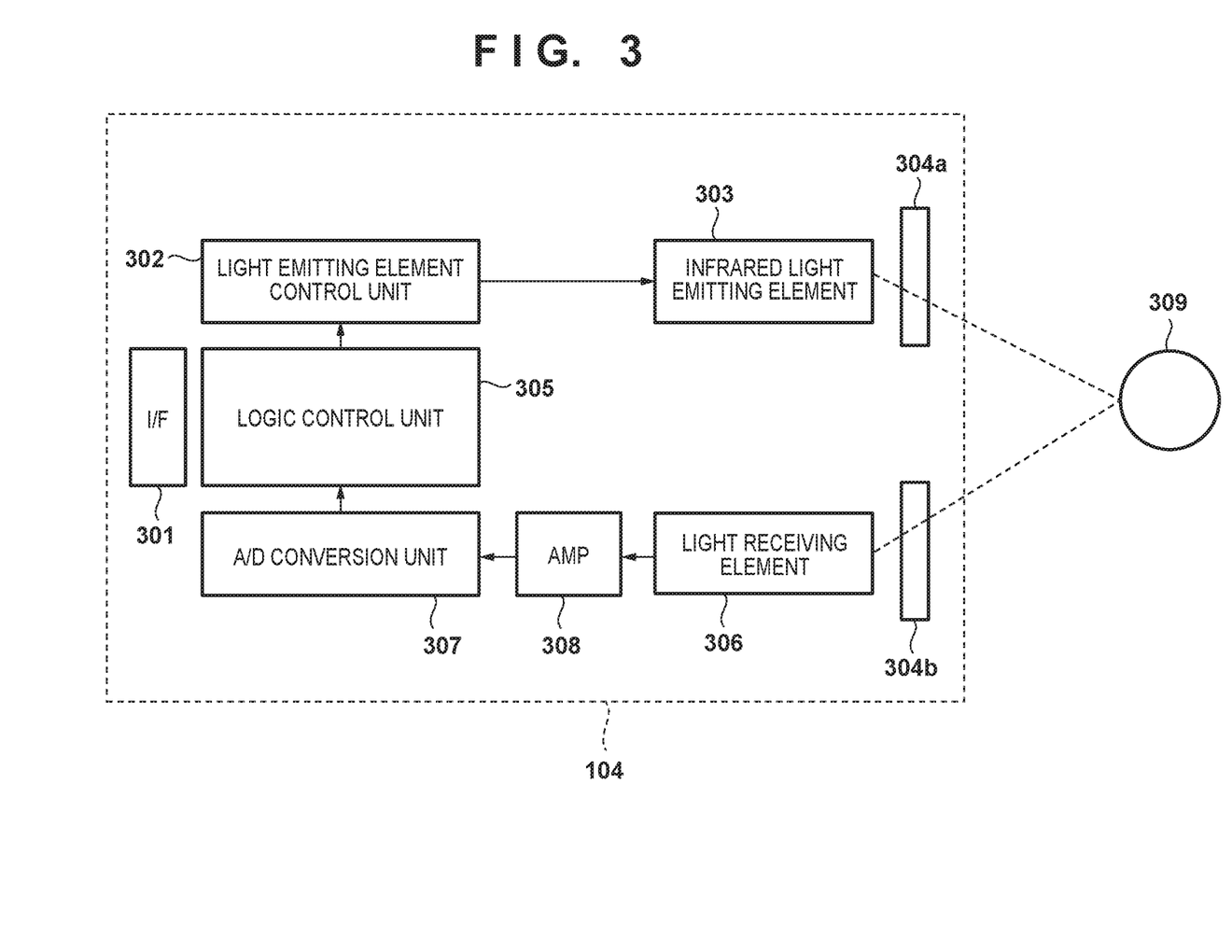
FIG. 3 is a block diagram showing an exemplary functional configuration of a proximity detection unit according to the embodiment.

Next, an exemplary functional configuration of the proximity detection unit 104 will be described, with reference to FIG. 3.

An external interface 301 is an external interface of the proximity detection unit 104, and performs transmission of control signals to the proximity detection unit 104 by the system control unit 50, notification of proximity detection results from the proximity detection unit 104 to the system control unit 50, and the like.

A light emitting element control unit 302 converts the forward current of an infrared light emitting element 303 to a constant current. Also, the amount of light emission of the infrared light emitting element 303 can be controlled by increasing or decreasing the forward current of the infrared light emitting element 303. The infrared light emitting element 303 irradiates an object 309 which is a physical object with light of a light amount associated with the current controlled by the light emitting element control unit 302, through an infrared light emitting lens window 304a. Note that, the object 309 is, in the example of the present embodiment, the face or part of the body of a user of the digital camera 100.

A logic control unit 305 includes a predetermined control circuit, and controls the various parts of the proximity detection unit 104. The logic control unit 305 controls the lighting/extinguishing timing of the infrared light emitting element 303, and the store/reset timing of a light receiving element 306. Also, the logic control unit 305 is able to set detection threshold values over a plurality of levels with respect to the output value from an A/D conversion unit 307, and is thus able to detect the proximity distance to the object 309 in a stepwise manner. The logic control unit 305 notifies the determination result of whether or not the detection threshold value was exceeded to the system control unit 50 through the external interface 301.

The light receiving element 306 receives light irradiated by the infrared light emitting lens window 304a that has been reflected by the object 309 and collected by a light receiving lens window 304b, performs photoelectric conversion thereon, and outputs an analog signal. An amplification unit 308 amplifies the analog signal output from the light receiving element 306, and outputs the resultant signal to the A/D conversion unit 307. The A/D conversion unit 307 converts the analog signal output from the amplification unit 308 into a digital signal.

Configuration of EVF Driving Unit 112

Figure 4:
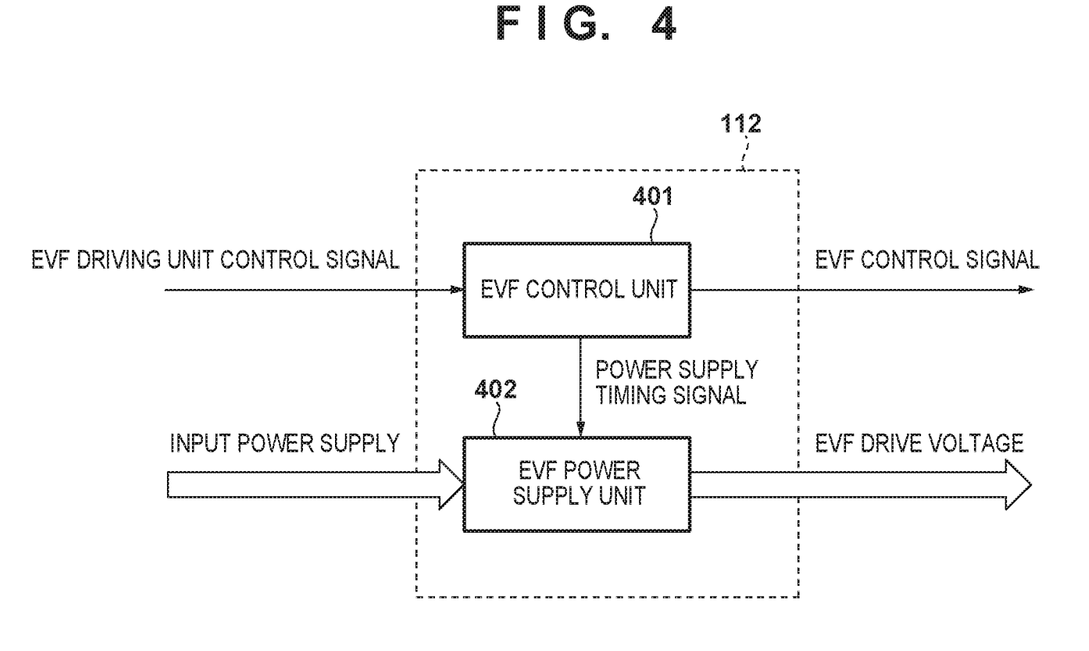
FIG. 4 is a block diagram showing an exemplary functional configuration of an EVF driving unit according to the embodiment.

Next, an exemplary functional configuration of the EVF driving unit 112 will be described, with reference to FIG. 4. The EVF driving unit 112 shown in FIG. 4 is constituted by an EVF control unit 401 and an EVF power supply unit 402.

The EVF control unit 401 supplies an EVF control signal for driving the EVF 105 to the EVF 105 based on an EVF driving unit control signal from the system control unit 50, for example, and supplies a power supply timing signal for driving the EVF 105 to the EVF power supply unit 402. The EVF power supply unit 402 generates a predetermined driving voltage for driving the EVF 105, based on the input power supply from the power supply unit 30. The EVF power supply unit 402 is a step-up unit and a step-down unit such as a DC-DC converter that generates a predetermined driving voltage. The EVF power supply unit 402 generates the driving voltage in synchronization with the power supply timing signal that is output from the EVF control unit 401, and applies the generated driving voltage to the EVF 105. Note that, at the time of the EVF power supply unit 402 generating a predetermined driving voltage, there is a risk that inrush current will occur when power is suddenly input, and the input power that is supplied will shut down. Thus, the EVF power supply unit 402, in the case of generating a predetermined driving voltage, suppresses the occurrence of inrush current by starting power supply gradually after the power supply timing signal is input. In this way, since the EVF power supply unit 402 starts power supply gradually, a predetermined amount of time will be required at the time of generating a predetermined driving voltage.

Figure 5A:
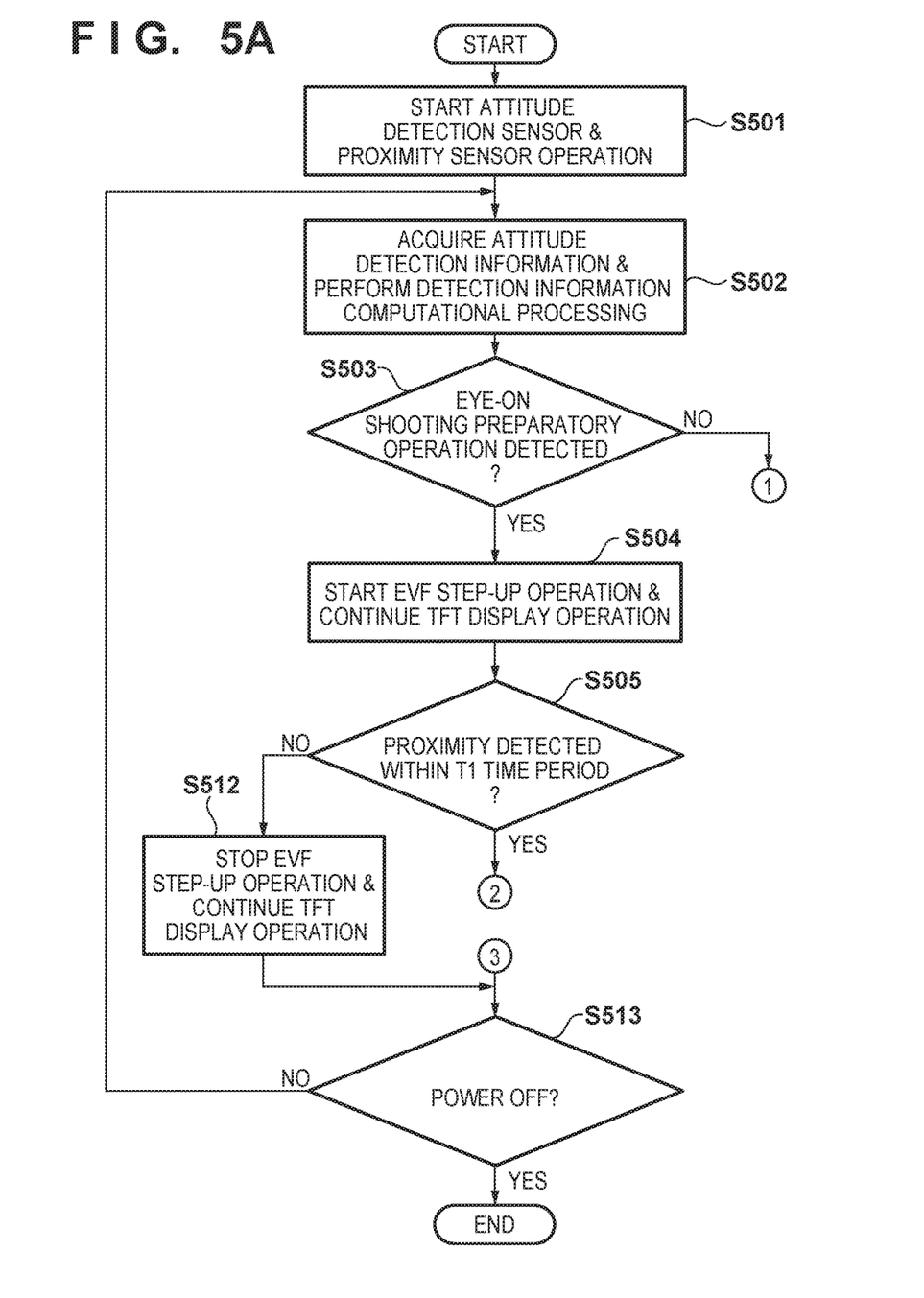
FIGS. 5A and 5B are flowcharts showing operations of a series of display control processing that uses display preparatory processing according to the embodiment.
Figure 5B:
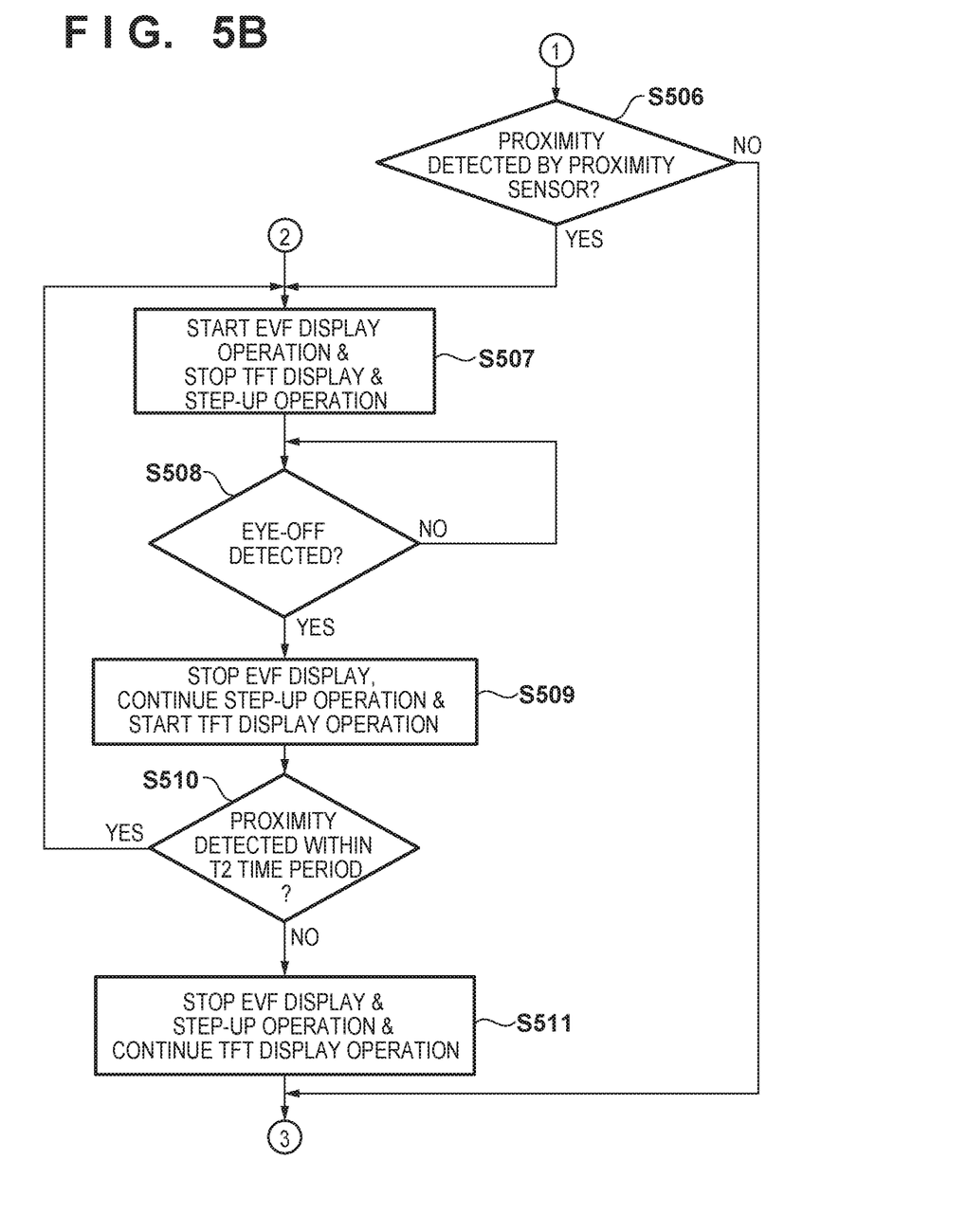

Series of operations related to display control processing using display preparatory processing Next, a series of operations related to display control processing using display preparatory processing for performing display on the EVF of the digital camera 100 will be described, with reference to FIGS. 5A and 5B. FIGS. 5A and 5B are flowcharts showing an image capturing operation in the present embodiment. Note that this processing is realized by a program recorded on the nonvolatile memory 56 being read out to the system memory 52 and the read program being executed by the system control unit 50. Also, this processing is started by the digital camera 100 starting up when the power switch 72 is turned on by a user, for example.

In step S501, the system control unit 50 starts up the attitude detection unit 55 and the proximity detection unit 104. In step S502, the system control unit 50 acquires attitude detection information representing the attitude of the digital camera 100 detected by the attitude detection unit 55, and performs computational processing on the acquired attitude detection information. The system control unit 50 determines whether the user is carrying out an eye-on shooting preparatory operation, using this computational processing. As will be discussed later with FIG. 6, in the case of the user carrying out an eye-on shooting preparatory operation (e.g., the user bringing the digital camera up to his or her face), the user moves the digital camera 100 quickly, in order to perform eye-on shooting from carrying out a manual operation or live view shooting. A large change in acceleration thus occurs in the vertical direction (up-down direction) or horizontal direction (left-right direction) of the digital camera 100.

Figure 7:
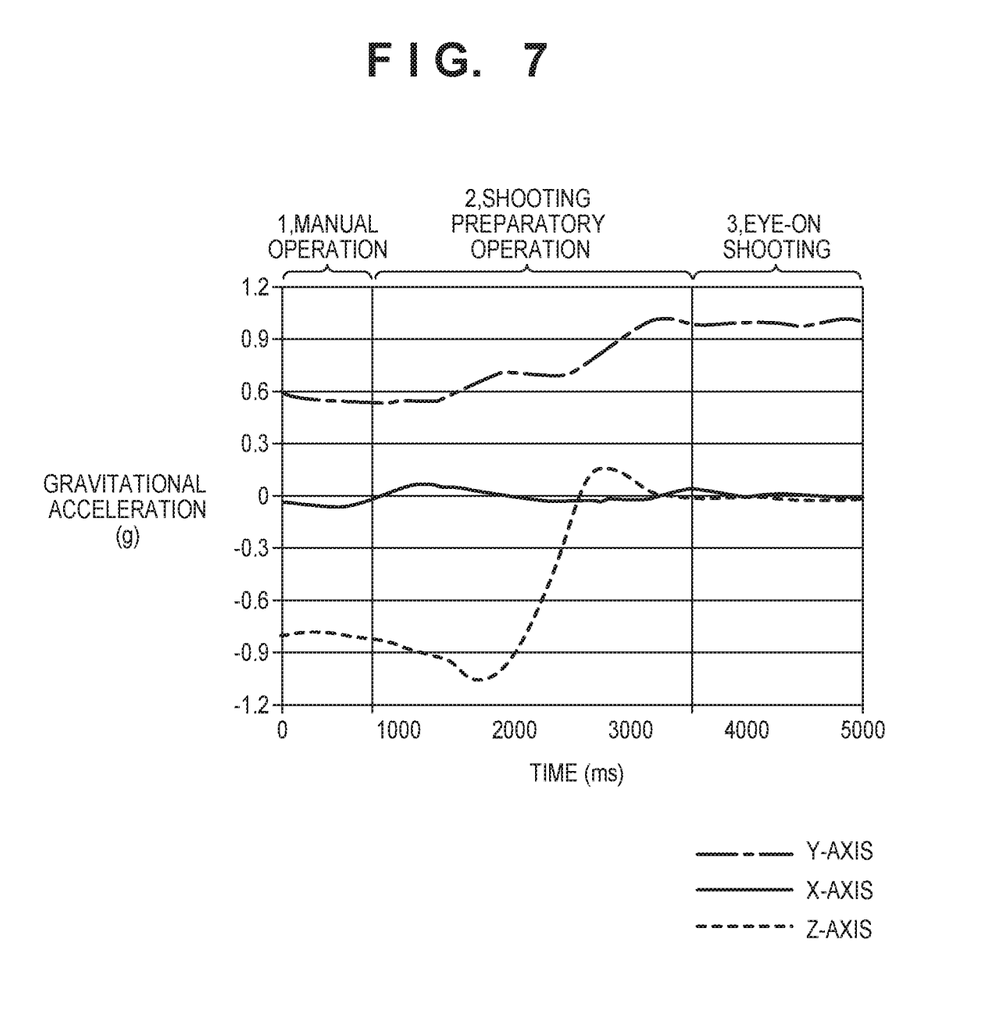
FIG. 7 is a diagram illustrating attitude detection information generated by an attitude detection unit when a user carries out an eye-on shooting preparatory operation.

The attitude detection information (e.g., change in acceleration that occurs in the digital camera 100) generated by the attitude detection unit when the user carries out an eye-on shooting preparatory operation will be described, with reference to FIG. 7. FIG. 7 shows the change in the output of the attitude detection unit 55 when the user transitions the digital camera 100 from carrying out a manual operation to performing eye-on shooting, as an example of an eye-on shooting preparatory operation. Since the user, when carrying out a manual operation, is looking at the display unit 28 with the body of the digital camera 100 at an angle, the Z-axis component of acceleration will be approximately −0.9 g, for example, in the range of area (1) in FIG. 7 indicating that a manual operation is being carried out. Furthermore, when the user swings the digital camera 100 up from this state in order to bring the digital camera 100 up to his or her eye, the state of acceleration changes, as shown in area (2) of FIG. 7. In this example, the Z-axis component of acceleration changes from approximately −1.0 g to about 0 g, and the Y-axis component of acceleration changes from approximately 0.5 g to approximately 1.0 g at the same time. This indicates that, since the user carries out an operation of quickly pulling the digital camera 100 closer in the front-back direction at the same time as swinging the digital camera 100 up, the Z-axis component of acceleration temporarily exhibits a change over 0 g (i.e., plus/minus of acceleration in the front/back direction is reversed). Also, since the user does not move the digital camera much in the horizontal direction in the eye-on shooting preparatory operation, the X-axis component of acceleration exhibits substantially zero in all of areas (1) to (3). The system control unit 50 determines that the user eye-on shooting preparatory operation has been detected, in the case where the attitude detection unit 55 detects this change in acceleration. And since the user will subsequently be in the eye-on state, the Y-axis component of acceleration will be approximately 1.0 g, as shown in the area (3) of FIG. 7.

For example, the system control unit 50 determines that an eye-on shooting preparatory operation has been detected, in the case where each component of the acceleration that is output from the attitude detection unit 55 satisfies the following conditions, for example. For example, an eye-on shooting preparatory operation is detected, in the case where the Z-axis component of acceleration reverses from a negative to a positive value, the Y-axis component changes to greater than or equal to a predetermined threshold value (about 0.3 g) within a predetermined period that includes the point in time of the reversal (e.g., 1500 ms before, 1000 msec after), and the X-axis component changes within a predetermined width (about 0.2 g).

In step S503, the system control unit 50 determines whether an eye-on shooting preparatory operation was detected from the computation result of step S502. The system control unit 50 proceeds to step S504 if it is determined that an eye-on shooting preparatory operation was detected, and proceeds to step S506 if this is not the case.

In step S504, the system control unit 50 starts an EVF step-up operation, in order to generate a driving voltage of the EVF 105. Specifically, the system control unit 50 transmits an EVF driving unit control signal for generating the driving voltage of the EVF 105 to the EVF driving unit 112. At this time, the EVF control unit 401 of the EVF driving unit 112 supplies the power supply timing signal for driving the EVF 105 to the EVF power supply unit 402, and the EVF power supply unit 402 starts generation of the driving voltage for driving the EVF 105, in response to the power supply timing signal. The system control unit 50 continues the display of the display unit 28 at this time. Note that, in the present embodiment, the abovementioned EVF step-up operation corresponds to display preparatory processing for controlling the display of the EVF 105.

In step S505, the system control unit 50 determines whether proximity of an object was detected by the proximity detection unit 104 within a T1 time period. At this time, T1 represents the amount of time from transitioning to the eye-on shooting preparatory operation until eye-on, for example, and is set to around 1 s. The system control unit 50 determines that proximity of an object was detected within the T1 time period clocked by the system timer 53, in the case where an output indicating proximity of an object by the proximity detection unit 104 (indicating that an object is closer than a predetermined proximity threshold value) is obtained within the T1 time period. The system control unit 50 proceeds to step S507 if it is determined that proximity of an object was detected within the T1 time period, and proceeds to step S512 if this is not the case.

In step S506, the system control unit 50 determines whether proximity of an object was detected by the proximity detection unit 104. The system control unit 50 proceeds to step S507 if it is determined that proximity of an object was detected, based on the detection result of the proximity detection unit 104, and proceeds to step S513 if this is not the case.

In step S507, the system control unit 50 starts the display operation of the EVF 105, and stops the display operation on the display unit 28 and the drive power supply generation operation. At this time, display of the EVF 105 is performed faster in the case where the EVF step-up operation is started or continued by the operation of step S504 or step S509 which will be discussed later, than in the case where the EVF step-up operation is not performed (in the case of passing via step S506). That is, since generation of the driving voltage of the EVF requires a fixed amount of time as mentioned above, display of the EVF can be performed faster in the case where the EVF step-up operation is started in advance after detection of the eye-on shooting preparatory operation, than in the case where the EVF step-up operation is started after eye-on is detected. On the other hand, in the case where display of the EVF 105 is performed via step S506, the EVF 105 is displayed after starting the display preparatory processing at the point in time of step S507.

In step S508, the system control unit 50 determines whether eye-off was detected from the detection result of the proximity detection unit 104. The system control unit 50 determines that eye-off was detected in the case where a detection result indicating that the object is further away than a predetermined proximity threshold value is obtained. The system control unit 50 proceeds to step S509 if it is determined that eye-off was detected, and proceeds to step S508 in order to again wait to determine whether eye-off was detected if this is not the case.

In step S509, the system control unit 50 stops the display operation of the EVF 105, and continues the driving voltage generation operation. That is, the EVF control unit 401 stops the display operation of the EVF with an EVF control signal, but controls the EVF power supply unit 402 to continue generating the EVF driving voltage for the EVF 105. On the other hand, the system control unit 50 resumes the display operation of the display unit 28 and the drive power supply generation operation.

In step S510, the system control unit 50 determines whether proximity of an object was detected by the proximity detection unit 104 within a T2 time period. T2 represents the amount of time from when the user takes his or her eye off the EVF until when eye-on shooting is again performed after carrying out post-shooting preview confirmation, and is set to about 4 s. The system control unit 50 determines that an object was detected within the T2 time period that is clocked by the system timer 53, in the case where proximity is detected by the proximity detection unit 104 within the T2 time period. The system control unit 50 returns to step S507 and repeats the abovementioned processing, if it is determined that proximity of an object was detected within the T2 time period. If this is not the case, the system control unit 50 proceeds to step S511.

In step S511, the system control unit 50 stops the EVF step-up operation of the EVF 105, and proceeds step S513. This is so that it can be judged that the user has not taken his or her eye off the EVF in order to carry out post-shooting preview confirmation, in the case where proximity is not detected by the proximity detection unit 104 within the T2 time period.

On the other hand, if it is determined in step S505 that proximity of an object not was detected within the T1 time period, the system control unit 50, in step S512, stops the EVF step-up operation of the EVF 105. This is because it is conceivable that the eye-on shooting preparatory operation in step S503 was erroneously detected in the case where proximity is not detected by the proximity detection unit 104 within the T1 time period.

In step S513, the system control unit 50 determines whether the power switch 72 is turned off. The system control unit 50 returns to step S502 and performs the same processing, if it is determined that the power switch 72 is not turned off, based on the signal of the power switch 72. On the other hand, if it is determined that the power switch 72 is turned off, the power supply of the digital camera 100 is subsequently turned off, and the present series of operations ends.

Exemplary EVF Display Using Display Preparatory Processing

Figure 6:
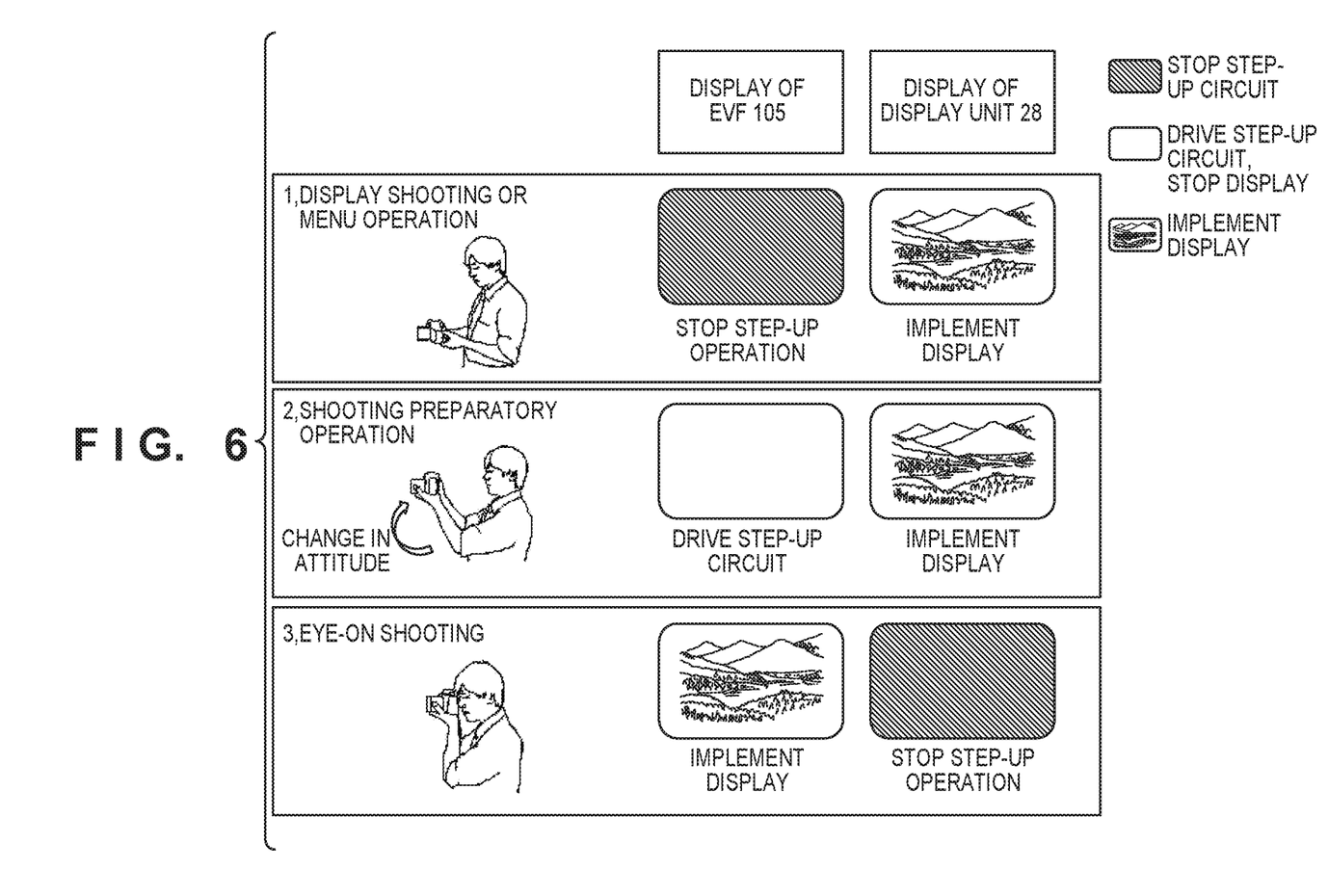
FIG. 6 is a diagram illustrating operating states of an EVF and a display unit resulting from display control processing that uses display preparatory processing of the embodiment.

Exemplary EVF display using the abovementioned display preparatory processing will be further described, with reference to FIG. 6. More specifically, an example in which the EVF display switching time period is shortened by starting the EVF step-up operation (i.e., display preparatory processing) of the EVF 105 in response to an eye-on shooting preparatory operation being detected in step S503 will be described.

As shown in (1) of FIG. 6, it is assumed that, in an initial state before eye-on shooting, the user is carrying out a manual operation (or live view shooting). In (1) of FIG. 6, an image is displayed on the display unit 28, but the step-up operation in the EVF 105 has not yet started.

From this state, as shown in (2) of FIG. 6, the user makes an up swinging movement in order to transition from carrying out a manual operation to performing eye-on shooting. At this time, the change in the acceleration described above with reference to FIG. 7 occurs in the digital camera 100. In (2) of FIG. 6, since the EVF step-up operation of the EVF 105 is started in response to the shooting preparatory operation being detected, the step-up circuit is driven in the EVF 105. On the other hand, the display unit 28 continues displaying an image.

Furthermore, eye-on is detected in (3) of FIG. 6. By starting the EVF step-up operation of the EVF 105 in (2) of FIG. 6 (i.e., prior to eye-on being detected by the proximity detection unit 104), display switching to the EVF 105 can be performed faster when the proximity state shown in (3) of FIG. 6 is detected.

As described above, in the present embodiment, the step-up operation (display preparatory processing) of the EVF 105 is started in response to an eye-on shooting preparatory operation being detected, and display of the EVF 105 is subsequently performed in response to proximity of an object being detected. This enables the display start time of the EVF 105 after eye-on of the user is detected to be shortened, and display switching between the EVF 105 and the display unit 28 to be performed faster.

Note that, although description of the present embodiment is given, taking an electronic device constituting two display units, namely, the EVF 105 and the display unit 28, as an example, the mode of the display unit is not limited thereto. That is, the abovementioned embodiment can be applied to any electronic device that uses at least one EVF. This also applies to a configuration having three or more display units including an EVF.

Also, although the present embodiment describes an example in which proximity of an object is detected using infrared projecting/receiving light as an example of the proximity detection unit 104, other methods such as a method of detecting with electrostatic capacity or an image capturing apparatus may be used.

Furthermore, although the present embodiment describes an example in which the attitude of the digital camera is detected with an acceleration sensor as an example of the attitude detection unit 55, other methods such as a method of detecting attitude using a gyroscope sensor may be used.

Also, the present embodiment describes an example in which transition from carrying out a manual operation to performing eye-on shooting is detected, as an example of the eye-on shooting preparatory operation. However, the eye-on shooting preparatory operation is not limited thereto. For example, a configuration may be adopted in which another operation involving swinging the electronic device up to on the eye from a predetermined operation state, such as an eye-on shooting preparatory operation from a live view shooting operation, is detected using the attitude detection unit 55.

Furthermore, although the present embodiment describes an example in which the system control unit 50 detects an eye-on shooting preparatory operation based on attitude detection information that is detected by the attitude detection unit 55, the attitude detection unit 55 may detect an eye-on shooting preparatory operation based on attitude detection information relating to itself. In this case, the system control unit 50 starts display preparation, in response to an eye-on shooting preparatory operation being detected by the attitude detection unit 55.

Also, although the present embodiment describes an example in which the digital camera 100 with a built-in taking lens is used, it is also naturally possible to apply the present embodiment to an interchangeable lens digital camera. In this case, a configuration may be adopted in which the condition for determining an eye-on shooting preparatory operation is changed according to the type of interchangeable lens (taking lens) mounted to a lens mounting unit. In this case, it suffices to change the condition of the change in acceleration that is applied in the case where an eye-on shooting preparatory operation is carried out, according to whether the mounted lens is heavy or light.

Note that the various abovementioned controls described as being performed by the system control unit 50 may be performed by one piece of hardware, or overall control of the device may be performed by plural pieces of hardware sharing the processing.

Also, although the present invention has been described in detail based on preferred embodiments thereof, the invention is not limited to these specific embodiments, and various modes in a range that does not depart from the spirit of the invention are also embraced therein. Furthermore, the aforementioned embodiments are merely illustrative of the invention, and it is also possible to appropriately combine the embodiments.

Also, although description of the aforementioned embodiments was given, taking the case where the present invention is applied to a digital camera as an example, the invention is not limited to this example, and is applicable to any portable device having a display unit for viewing images in an eye-on state. That is, the present invention is applicable to glasses-type mobile terminals, goggle-type AR and VR terminals, goggle-type information terminals, game devices, medical equipment and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-127828, filed Jun. 29, 2017, which is hereby incorporated by reference herein in its entirety.

What is claimed is:

1. An electronic device comprising:
a motion detector configured to detect motion of the electronic device;
a proximity detector configured to detect proximity of an object to the electronic device;
a display;
a memory; and
at least one processor that function as:
a control unit configured to control display preparatory processing for performing display on the display so as to start in response to predetermined motion of the electronic device being detected based on motion detected by the motion detector; and
a display control unit configured to control display so as to be performed on the display in response to proximity of an object being detected by the proximity detector,
wherein the predetermined motion is detected, in a case where motion in which acceleration in a vertical direction of the electronic device changes by greater than or equal to a threshold value and acceleration in a horizontal direction of the electronic device changes within a predetermined width is detected by the motion detector, within a predetermined period that includes a point in time at which positive and negative of acceleration in a front-back direction of the electronic device is reversed.

2. The electronic device according to claim 1,
wherein the control unit controls the display preparatory processing for performing display on the display so as to start in response to proximity of an object being detected by the proximity detector without detecting the predetermined motion, and then the display control unit controls display so as to be performed on the display.

3. The electronic device according to claim 1,
wherein the predetermined motion is motion bringing the electronic device close to a face.

4. The electronic device according to claim 1,
wherein the display is visible via an eyepiece unit of a viewfinder,
wherein the proximity detector functions as an eye-on detection unit configured to detect an eye being on the eyepiece unit, and
wherein the predetermined motion is motion involving a user moving the electronic device in order to have an eye be on the eyepiece unit.

5. The electronic device according to claim 4, further comprising a display monitor provided externally to the viewfinder,
wherein the predetermined motion is motion involving the user moving the electronic device in order to have eye be on the eyepiece unit from a state of viewing the display monitor.

6. The electronic device according to claim 5,
wherein the display control unit continues display on the display monitor when the display preparatory processing is started, and stops display on the display monitor in response to display being performed on the display.

7. The electronic d according to claim 1,
wherein the display preparatory processing is processing for generating a driving voltage for driving the display.

8. The electronic device according to claim 7,
wherein, in the processing for generating the driving voltage, power supply is started gradually in order to suppress occurrence of an inrush current, after a power supply timing signal is input.

9. The electronic device according to claim 1,
wherein a condition for determining that the predetermined motion has occurred changes according to a type of interchangeable lens mounted to a lens mounting unit.

10. The electronic device according to claim 1,
wherein the electronic device is an image capturing apparatus having an image capturing unit.

11. A control method for an electronic device having a motion detector configured to detect motion of an electronic device, a proximity detector configured to detect proximity of an object to the electronic device and a display, the control method comprising:
controlling display preparatory processing for performing display on the display so as to start in response to predetermined motion of the electronic device being detected based on motion detected by the motion detector;
controlling display so as to be performed on the display in response to proximity of an object being detected by the proximity detector, and detect n the predetermined motion, in a case where motion in which acceleration in a vertical direction of the electronic device changes by greater than or equal to a threshold value and acceleration in a horizontal direction of the electronic device changes within a predetermined width is detected by the motion detector, within a predetermined period that includes to point in time at which positive and negative of acceleration in a front back direction of the electronic device is reversed.

12. A non-transitory computer-readable storage medium storing a program for causing a computer to execute a control method of an electronic device having a motion detector configured to detect motion of an electronic device, a proximity detector configured to detect proximity of an object to the electronic device and a display, the control method comprising:

controlling display preparatory processing for performing display on the display so as to start in response to predetermined motion of the electronic device being detected based on motion detected by the motion detector;

controlling display so as to be performed on the display in response to proximity of an object being detected by the proximity detector, and detecting the predetermined motion, in a case where motion in which acceleration in a vertical direction of the electronic device changes by greater than or equal to a threshold value and acceleration in a horizontal direction of the electronic device changes within a predetermined width detected by the motion detector, within a predetermined period that includes a point in time at which positive and negative of acceleration in a front -back direction of the electronic device is reversed.

13. An electronic device comprising:
a motion detector configured to detect motion of the electronic device;
a proximity detector configured to detect proximity of an object to the electronic device;
a display;
a memory; and
at least one processor that function as:
a control unit configured to control display preparatory processing for performing display on the display so as to start in response to predetermined motion of the electronic device being detected based on motion detected by the motion detector; and a display control unit configured to control display so as to be performed on the display in response to proximity of an object being detected by the proximity detector, wherein a condition for determining that the predetermined motion has occurred changes according to a type of interchangeable lens mounted to a lens mounting unit.

14. A control method for an electronic device having a motion detector configured to detect motion of an electronic device, a proximity detector configured to detect proximity of an object to the electronic device and a display, the control method comprising;

controlling display preparatory processing for performing display on the display so as to start in response to predetermined motion of the electronic device being detected based on ,notion detected by the motion detector; and controlling display so as to be performed on the display in response to proximity of an object being detected by the proximity detector, wherein a condition for determining that the predetermined motion has occurred changes according to a type of interchangeable lens mounted to a lens mounting unit.

15. A non-transitory computer-readable storage medium storing a program for causing a computer to execute a control method of an electronic device having a mono detector configured to detect motion of an electronic device, a proximity detector configured to detect proximity of an object to the electronic device and a display, the control method comprising:

controlling display preparatory processing for performing display on, the display to as to start in response to predetermined motion of the electronic device being detected based on motion detected by the motion detector; and controlling display so as to be performed on the display in response to proximity of an object being detected by the proximity detector, wherein a condition for determining that the predetermined motion has occurred changes according to a type of interchangeable lens mounted to a lens mounting unit.

\* \* \* \* \*